US008645172B2

(12) United States Patent
Mehl et al.

(10) Patent No.: US 8,645,172 B2
(45) Date of Patent: Feb. 4, 2014

(54) PASSENGER CHECK-IN FINALIZATION

(75) Inventors: Thomas Walter Heinrich Mehl, Brooklyn, NY (US); Eric Allan Frome, Farmington, MN (US); Divish Priya Ranjan, Austin, TX (US); Rosalie Mack Phillips, Eagan, MN (US); Seth Aaron Horowitz, Salt lake City, UT (US)

(73) Assignee: Accenture Global Services Limited, Dublin 4 (IE)

( * ) Notice: Subject to any disclaimer, the term of this patent is extended or adjusted under 35 U.S.C. 154(b) by 650 days.

(21) Appl. No.: 12/550,784

(22) Filed: Aug. 31, 2009

(65) Prior Publication Data

US 2011/0054954 A1 Mar. 3, 2011

(51) Int. Cl.
*G06Q 10/00* (2012.01)
(52) U.S. Cl.
USPC ............... 705/5; 705/1.1; 705/7.11; 705/7.27
(58) Field of Classification Search
USPC ........... 705/5, 6, 1, 1.1, 7.11, 7.25, 301, 7.27, 705/7.2
See application file for complete search history.

(56) References Cited

U.S. PATENT DOCUMENTS

| 7,219,074 B2* | 5/2007 | Capek et al. ................ 705/26.8 |
| 2001/0016825 A1* | 8/2001 | Pugliese et al. ................... 705/5 |
| 2007/0061182 A1 | 3/2007 | Brooks et al. |
| 2007/0226680 A1* | 9/2007 | Kumhyr et al. ............... 717/102 |

FOREIGN PATENT DOCUMENTS

| WO | WO0163533 A9 | 8/2001 |
| WO | WO2006111411 A1 | 10/2006 |

OTHER PUBLICATIONS

KLM Internet Check In, archived Mar. 13, 2009, retreived Aug. 9, 2013m http://www.sleeplessinkl.com/2008/06/01/klm-internet-check-in.*
"Northwest Airlines to Implement New Reservations Procedures," Mar. 20, 2000, PR Newswire Association LLC.*
Business & Travel Editors, "Alaska Airlines, Horizon Air Offer Tips for Enjoying the Holidays," Dec. 19, 2002, Business Wire.*
European Search Report for Application No. 10 008 002.7, dated Jun. 29, 2011, 5 pages.

* cited by examiner

*Primary Examiner* — Michael Harrington
(74) *Attorney, Agent, or Firm* — Fish & Richardson P.C.

(57) ABSTRACT

This document describes a computer-implemented method for facilitating a check-in finalization process for a travel passenger. The method includes receiving one or more check-in parameters related to a check-in procedure for a passenger checking in for a travel segment, and determining from the received check-in parameters a check-in workflow status corresponding to which of a plurality of steps of the check-in procedure have been completed. The method also includes identifying one or more finalization actions that are available for finalizing the check-in procedure based on the check-in workflow status. The method further includes determining a primary finalization action from the one or more finalization actions, the primary finalization action being the finalization action most likely to be taken to finalize the check-in procedure. The method also includes providing for display on a user interface the available finalization actions, where the primary finalization action is pre-selected on the user interface.

19 Claims, 7 Drawing Sheets

PASSENGER CHECK-IN FINALIZATION

TECHNICAL FIELD

This document relates to systems and techniques for checking in travel passengers.

BACKGROUND

Travel services, such as airlines, buses, trains, boats, and the like often use procedures for checking in passengers prior to departure. For instance, at an airport, a ticket agent for a particular airline may run through a number of different steps, such as checking baggage, offering optional services or upgrades, and collecting payments, for example. At the end of these check-in procedures, a finalization step may be used to complete the check-in transaction. The passenger check-in procedures are often computerized, and may be displayed to ticket agents in a number of different forms, including via a text-based keyboard and command-driven format or via a graphical user interface (GUI) that may typically utilize user input devices such as a keyboard and a mouse for entry of information.

The check-in procedures are often time-sensitive as travel providers want to check in passengers as quickly as possible to avoid long lines or other backups at the point of departure. Highly-skilled, experienced check-in agents can use the text-based keyboard and command-driven interface very quickly and efficiently to check in travel passengers. On the other hand, travel providers also want to provide a high level of service and check-in accuracy for their passengers, even with less-experienced check-in personnel. The GUI format for checking in passengers is often easier and more intuitive, but is traditionally slower than checking passengers in using the text-based approach. These considerations may therefore be at odds, requiring the travel provider to strike a balance between speed and customer service.

SUMMARY

This document describes systems and techniques that may be used to identify, for any given situation, the most likely finalization action to be taken by a user in a passenger check-in finalization step. In general, the system determines the finalization actions that should be made available to the user from among a number of possible finalization actions. The system also determines which of the available actions is the most logical action that the user should take, considering the progress of the check-in procedure. The system then provides a user interface that displays the available steps to the user and pre-selects the most logical action, such that the user can, in most circumstances, proceed with finalization using a single key press or mouse click.

The available finalization actions and the pre-selection of the most likely finalization action are based on the status of the check-in procedure for the passenger checking in (e.g., the passenger has already checked in online; the passenger has checked in, but has not yet checked bags; the passenger has not checked in; etc.). The available actions and the pre-selection of the most likely finalization action may also be based on other parameters, such as the passenger's preferences or check-in tendencies, the location or type of the terminal, or other appropriate parameters.

In certain implementations, such systems and techniques may provide one or more advantages. For example, rules for identifying the available finalization actions and determining the pre-selected action may be configurable for different travel providers such that they may implement their own logic appropriate for their particular check-in procedures. Also, by pre-selecting the most likely finalization action to be taken in the finalization step, the system assists the user by identifying the appropriate finalization action for the particular situation, and allows the user to initiate final processing through a single mouse click or keyboard entry. This results in a check-in interface that requires less analysis by the user and less user input in most situations, both of which generally lead to faster passenger check-in times.

In one implementation, a computer-implemented method for facilitating a check-in finalization process for a travel passenger is disclosed. The method includes receiving one or more check-in parameters related to a check-in procedure for a passenger checking in for a travel segment, and determining from the received check-in parameters a check-in workflow status corresponding to which of a plurality of steps of the check-in procedure have been completed. The method also includes identifying one or more finalization actions that are available for finalizing the check-in procedure based on the check-in workflow status. The method further includes determining a primary finalization action from the one or more finalization actions, the primary finalization action being the finalization action most likely to be taken to finalize the check-in procedure. The method also includes providing for display on a user interface the available finalization actions, where the primary finalization action is pre-selected on the user interface.

In another implementation, a computer-implemented passenger check-in system includes one or more computers having an interface for a check-in workflow system configured to receive one or more check-in parameters related to a check-in procedure for a passenger checking in for a travel segment at a departure terminal. The system further includes a provider rules database storing configurable rules information associated with a travel provider. The system also includes a check-in workflow engine configured to identify, using the configurable rules information, one or more finalization actions that are available for finalizing the check-in procedure based on the check-in parameters, and to determine, using the configurable rules information, a primary finalization action from the one or more finalization actions, the primary finalization action being the finalization action most likely to be taken to finalize the check-in procedure. The system also includes a display device configured to present a user interface showing the available finalization actions, where the primary finalization action is pre-selected on the user interface.

The details of one or more implementations are set forth in the accompanying drawings and the description below. Other features and advantages will be apparent from the description and drawings, and from the claims.

DETAILED DESCRIPTION

Figure 1:
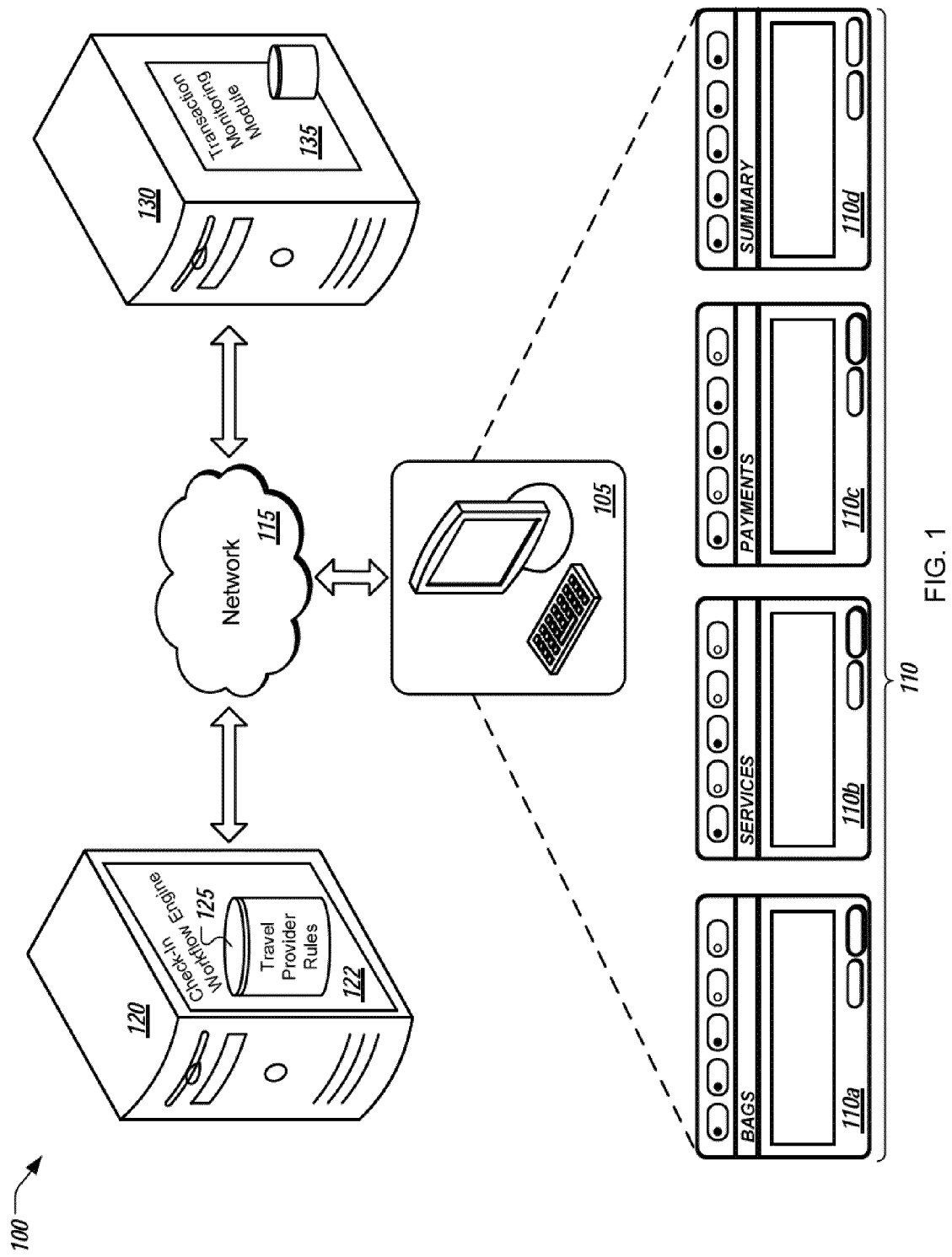
FIG. 1 is a conceptual diagram of a representative passenger check-in system.

This document describes systems and techniques for intelligently guiding a user, such as a check-in agent, through a finalization step. Such techniques may include identifying one or more available finalization actions based on the check-in workflow status (e.g., not checked in; checked in without bags; etc.) of a particular check-in procedure. The techniques may also include determining a primary finalization action that is the most likely action that needs to be taken by the user, given the status of the check-in. The available finalization actions may be provided to a user interface for display, and the primary finalization action may be pre-selected such that the user can initiate check-in finalization with a single key press or mouse click, for example.

A typical check-in procedure or workflow for travel passengers in the airline industry may include several different check-in steps, some of which may be completed by the passenger prior to arriving at the airport, and some of which may be completed by a check-in agent. For example, some check-in procedures may include one or more steps related to searching for passenger information, assigning seats, handling baggage, adding optional services, receiving payments, and/or finalizing the passenger check-in. It should be understood that many of these steps may be interrelated, and may occur in a different order or may be left out of a particular check-in procedure. In addition, certain travel providers may use different check-in procedures that are specifically tailored to their own processing steps.

As an example of a passenger search step, a check-in agent may enter passenger identification information to locate a particular passenger's travel itinerary to begin the check-in process. The passenger identification information may take several different forms, but may include a passenger name, credit card information, a record locator, flight information, etc. In a seat assignment step, the check-in agent may assign a seat to a passenger or may modify an existing seat assignment to ensure that the passenger is seated in a particular desired seat location or section. In a baggage handling step, the passenger may be allowed to check one or more bags at the check-in counter. In an optional services step, a passenger may be offered various options for the flight, such as a seat upgrade, an in-flight movie, meal services, etc. In a payment step, the passenger may provide payment for the segment or additional services, including for example, checking an oversized bag or upgrading a seat to first class.

After the other check-in procedures have been completed, a finalization step may be provided to complete the check-in process. The finalization step may include a number of possible finalization actions, such as checking in the passenger, providing baggage options for a checked-in passenger, saving changes made during the previous check-in procedures without actually checking in the passenger, unchecking a previously checked—in passenger, printing or reprinting various travel documents, or the like.

The following examples are illustrative of various situations where some of these finalization actions may be available (or unavailable) to a check-in agent, according to some implementations. For example, a finalization action related to checking-in a passenger may be available in a finalization step if the passenger has not yet checked in, but such an action may be unavailable if the passenger is already checked in or if check-in is otherwise unavailable. If passenger check-in is available, various sub-actions may also be provided, based on what has previously taken place during the passenger check-in workflow (e.g., if a passenger has added an optional service and provided payment information, a payment authorization sub-action may be included as part of the finalization procedure). As another example, a finalization action relating to unchecking a passenger may be available for checked in passengers who need to be removed from a travel segment, such as in the case where a passenger was delayed during the first segment of a multi-segment itinerary and is unable to catch the second segment. If an uncheck action is selected during finalization, various optional sub-actions may also be presented, such as removing the unchecked passenger's bags and/or removing the unchecked passenger's seat assignment. The finalization actions and the situations in which they are available for selection by a check-in agent are completely configurable by the travel providers, and as such, other finalization actions may be utilized in addition to or instead of those discussed above.

Based on the previous actions that have occurred during the check-in process, and possibly based on other parameters, one of the finalization steps may be identified as the most likely to be actuated by the check-in agent. For example, it may be determined that, if a passenger has checked-in online and checked-in baggage at the terminal, the passenger will just need to have his boarding pass and itinerary printed about 95% of the time. Given the same or a similar situation then, the system may pre-select a printing finalization action when the user gets to the finalization screen of a check-in procedure, thus showing the user that printing is likely to be the action that will be used in the finalization step. This, and other situation-specific rules, may be stored in a configuration rules database, as described in greater detail below.

FIG. 1 is a conceptual diagram of a representative passenger check-in system 100. The system 100 as shown includes a user workstation 105 capable of providing a user interface 110 to a user. In some implementations, the user interface 110 may include a number of different check-in screens 110a-d that may be presented to the user in a particular order. For example, the screens may be presented in series as part of a check-in workflow. As shown, screen 110a may relate to a step for checking in bags, screen 110b may relate to a step for adding optional services, screen 110c may relate to passenger payments, and screen 110d may relate to a finalization or summary screen. Each of the different screens may relate to a different step in a check-in workflow, or may include multiple steps in the workflow. Alternatively, multiple screens may be used to present a single workflow step to the user.

The user interface 110 may also employ different graphical interface concepts to display steps of the check-in workflow to a user of the system 100. For example, rather than using multiple screens, a single screen may be used. In some implementations, a single screen may include various tabs that a user may select to move to a different step in the process. In other implementations, a single screen may include various sections that are related to the steps in the check-in process.

The user workstation 105 may be communicably coupled to a number of components of the system 100, such as via a network 115. The network may be made up of any appropriate communications channels, either alone or in combination, such as the Internet, a local area network (LAN), a wide area network (WAN), a wired or wireless network, or the like. Other components of the system 100 may include a workflow server 120 and a transaction server 130, for example.

The workflow server 120 may host a check-in workflow engine 122 configured to generate and update check-in workflows based on various inputs, conditions, and rules. The workflow engine 122 may reference travel provider rules 125 that describe how their particular user interfaces and workflows should be generated. The workflow engine 122 may also be used to identify aspects of the user interface 110 that should be displayed during a given step of the workflow. For example, at a summary or finalization screen 110d, the workflow engine 122 may be used to identify the available finalization actions to be presented to the user. The workflow engine 122 may also be used to determine which of the available finalization actions is the most likely action to be taken by a user based on, e.g., the check-in steps that have already been completed for the passenger checking in, passenger preferences or tendencies, terminal type or location, and the like. The travel provider rules 125 allow each provider to configure rules that are most effective for their own particular check-in procedures.

One of the inputs to the workflow server 120 may include information relating to various transactions occurring during, or relating to, the check-in procedure. This transactional information may be stored and/or monitored, for example, by a transaction monitoring module 135 hosted on a transaction server 130. The transaction monitoring module 135 may monitor and store information corresponding to check-in transactions, such as payment authorizations, baggage handling transactions, seat assignments or reassignments, or the like. The monitoring module 135 may also keep track of other applicable information that may be requested by, or otherwise transmitted to, the workflow server 120.

The workflow server 120 may be configured to aggregate information from these inputs and/or others to generate an optimized workflow procedure for checking in passengers, including a finalization step that identifies one or more appropriate finalization actions and pre-selects the most likely finalization action to be taken by the user in a given situation. The available finalization actions and the primary finalization action (e.g., the one available action that is most likely to be used to complete the check-in transaction) may be determined on a situational basis and displayed on the user interface 105. The case-by-case analysis of the appropriate finalization actions and the determination of the primary action may take into account a host of information, including the overall status of the check-in procedure, and also other parameters relevant to the finalization of the check-in procedure.

In the example shown in FIG. 1, screens 110a-d represent an example workflow that begins with a baggage check-in screen 110a, continues to a services screen 110b, then moves to a payments screen 110c, and then to a summary or finalization screen 110d. The finalization screen 110d is discussed in greater detail in association with FIGS. 3-4.

Figure 2:
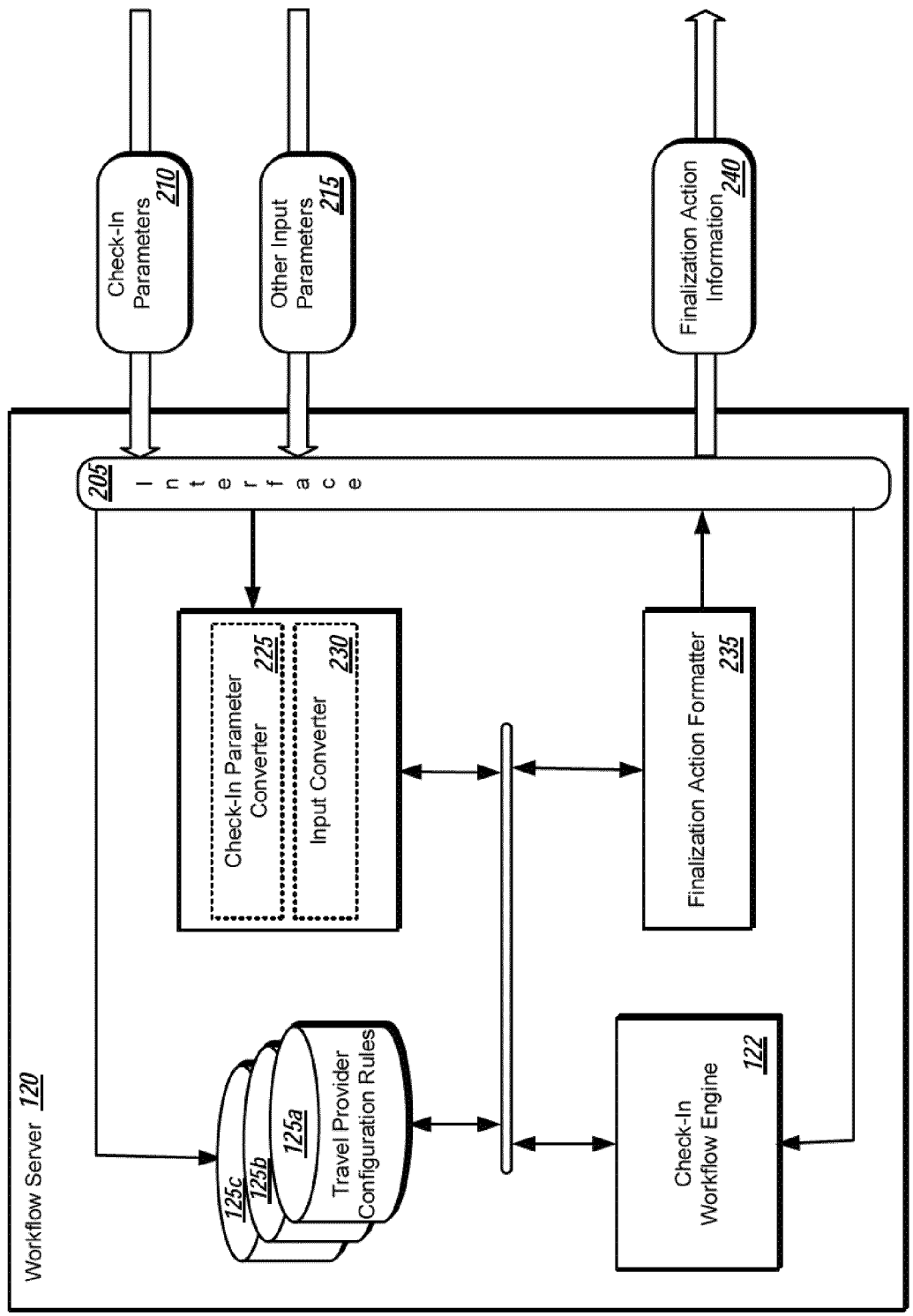
FIG. 2 is a block diagram of a representative check-in workflow system.

FIG. 2 is a block diagram of a representative check-in workflow system. The system may be hosted by a workflow server 120, may be hosted on another component of the system 100, or may be spread across multiple components of the system 100. Inputs to the workflow server 120 may include one or more check-in parameters 210. In some implementations, the check-in parameters 210 may include, for example, the state of completion of various check-in steps of the check-in workflow; the state of other check-in parameters such as payment authorization and approval parameters, which may be received from a check-in transaction server 130 as described above; information from other components of the system 100; or any other appropriate check-in parameters. Other input parameters 215 may also be requested and/or received by the workflow server 120 including, by way of example only, information related to the passenger's travel preferences or tendencies (e.g., whether the passenger has expressed a desire to receive duplicate copies of itineraries and invoices; whether the passenger frequently changes flights after checking-in to a flight, such as by flying standby on a different flight, and therefore frequently needing to be unchecked from an original flight; etc.), or information related to the type or location of the departure terminal (e.g., whether the terminal is a bus, train, airport, or other type of terminal; whether it is located near a tropical resort destination that is likely to service more tourists than business travelers; etc.).

The check-in parameters 210 and other input parameters 215 may be received by an interface 205 of the workflow server 120. The workflow server 120 may use these parameters to identify finalization action information 240, and in some implementations, to provide the finalization action information in the form of a check-in finalization screen that can be displayed via a user interface 110 to the user of workstation 105. In certain implementations, the finalization action information 240, or portions thereof, may also be provided to other components of the system 100 by way of the interface 205.

One or more converters may also be included to convert inputs to the workflow server 120 into a standardized format. As an example, the workflow server 120 may serve multiple different travel providers, all of which may have their own different ways of representing various check-in parameters 210 or other input parameters 215. A check-in parameter converter 225 may identify which travel provider is providing the check-in parameters and use a conversion mechanism, e.g., a look-up table or the like, to translate the travel provider's specific check-in parameters 135 into a common parameter type used by the check-in workflow engine 122. For example, one travel provider may use numerical status codes, while another travel provider may instead use textual status descriptions—in either case, the check-in parameters input to the workflow server 120 may be converted using the converter 225 into a format that is recognized by the check-in workflow engine 122. Similarly, certain travel providers may allow various forms of other input parameters 215, which may need to be converted by an input converter 230 before being passed to the check-in workflow engine 122.

The workflow server 120 may also include a number of different configuration rules databases 125a-c, which may each relate to the specific rules that have been defined for a particular travel provider. Alternatively, databases 125a-c may be combined into a single database that includes configuration rules for all of the travel providers that are serviced by the workflow server 120. The travel provider configuration rules 125a-c may be configurable during a setup phase, as is described in greater detail below in association with FIG. 5B, and may be changed over time as the travel providers change their desired check-in operations or priorities. In some implementations, the configuration rules databases 125a-c may be hosted on different components of the system 100.

The travel provider configuration rules 125a-c may be set up to include rules relating to various check-in procedures and may be used to define the check-in workflows, including finalization procedures, for any number of different situations as defined by the travel provider. As such, certain travel providers may present different available finalization actions and/or a different primary finalization actions, even under the same set of check-in conditions.

In implementations where the configuration rules are travel provider specific, as shown in rules databases 125a-c, each travel provider may decide what is important to its own check-in procedures, and may also decide the appropriate finalization actions to be presented to a check-in agent. The definition of appropriate rules may be separate and independent for each different travel provider. The rules configuration process is discussed in greater detail below. In some implementations, a single travel provider may have multiple sets of rules.

The workflow server 120 may also include a check-in workflow engine 122 that is configured to identify one or more available finalization actions based on the check-in workflow status (e.g., not checked in; checked in without bags; etc.) of a particular check-in procedure. The workflow engine 122 may also determine a primary finalization action that is the most likely action that needs to be taken by a user, given the status of the check-in. For example, it may be determined that, if a passenger has checked-in online and checked-in baggage at the terminal, the passenger will likely just need to have his boarding pass and itinerary printed most of the time. Given the same or a similar situation then, the workflow engine 122 may be used to pre-select a printing finalization action as a logical finalization step. In some implementations, the check-in workflow engine 122 may include a set of default rules that may be used in the case where one or more travel provider specific rules 125*a-c* are not determinative of a particular situation.

The check-in workflow engine 122 may include a state database that tracks the state of various check-in related steps in the process. For example, a number of the steps may be considered required steps, such that the check-in may not be completed until the required step has been completed. Other steps may be considered optional steps, such that the check-in may be completed without the user visiting the optional screens, but the optional screens are available to be visited during the check-in procedure. Other steps may be considered disabled or inactive steps, such that the screens are not made available to the user during the check-in procedure.

Additional state information may include whether a particular step has been visited by the user (e.g., whether the user has visited an optional screen) and/or whether a particular step has been completed. Whether a particular step has been completed may be dependent upon the travel provider specific rules 125*a-c* and the actions that have been taken by the user related to that particular step.

The workflow server 120 may also include a finalization action formatter 235 that may be used to provide appropriate finalization action information 240 to other components of the system 100. In some implementations, the formatter 235 may be used to format various check-in finalization procedures and a related finalization check-in screen that may be presented to the user. In some implementations, the available finalization actions identified by the check-in workflow engine 122 may be provided to a user interface for display, and information relating to the primary finalization action may be sent to the workstation 105, such that the primary finalization action will be pre-selected on the finalization screen. In other implementations, the formatter 235 may identify certain portions of the finalization action information 240 to be sent to various components of the system 100.

Figure 3:
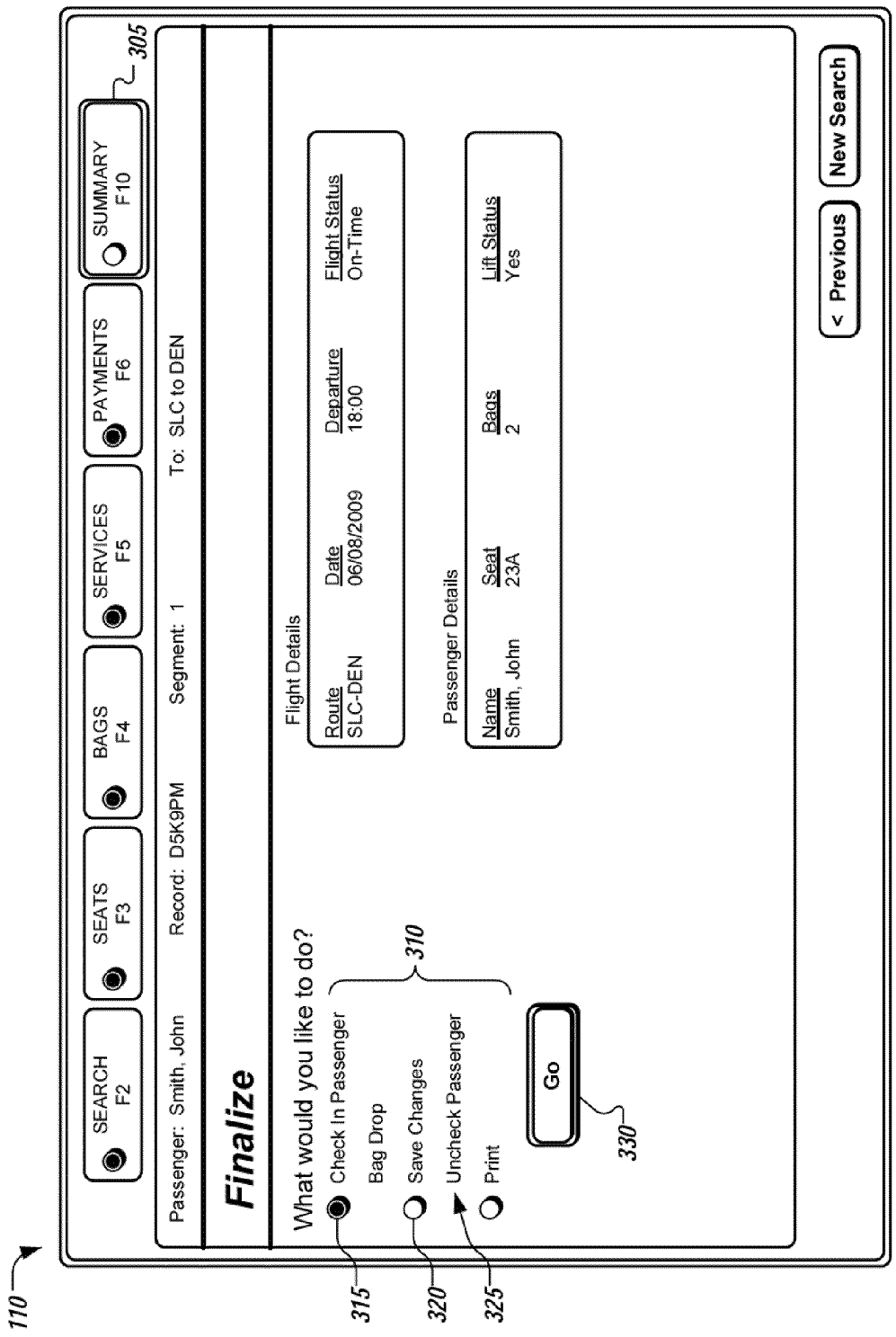
FIGS. 3 and 4 are example screen shots of a user interface for a finalization step of a check-in procedure.

FIG. 3 is an example screen shot of a user interface 110 for a finalization step of a check-in procedure. The user interface 110 may include a number of different input and output options that allow a user to complete the passenger check-in processes as described herein. In some implementations, the finalization user interface 110 may be a graphical user interface (GUI) that includes a number of different finalization actions 310, selection indicators 315, 320, options, buttons, input boxes, textual displays, etc.

In some implementations, the user interface 110 may include a set of screen buttons or links, with each button relating to a different step or group of steps in a check-in workflow, or to a different screen, etc. As shown in interface 110, the screen buttons may include indicators that show the state of a particular step, indicating whether the particular step is required, optional or disabled, and/or whether the step is complete or incomplete, etc. For example, an indicator showing a filled-in circle (as shown for each of the screens in this example) may relate to a check-in step that has already been completed by the user, while an indicator showing an empty circle may relate to a step that is incomplete. In other implementations, the indictor may be a colored indicator, such as green for a completed step, yellow for an optional incomplete step, or red for a required incomplete step, for example. The button 305 corresponding to the current step in the process may be highlighted, such as by including a visual border or outline around the button, or by some other visual indication on the interface.

The screen buttons may also be associated with a related hotkey or other command that allows a user to switch to that particular screen or step from anywhere in the workflow. As shown in the example screen shot, the Seats screen is accessible by pressing the F3 button on a keyboard. Similarly, the user may be able to click on the button using a mouse or other input device to indicate a desire to jump to the particular screen corresponding to the screen button. In some implementations, this may allow a check-in agent to jump to any available step in the process at any point in the check-in process.

As shown in the example user interface 110, the finalization step may allow the user to select from a number of possible finalization actions 310. The actions shown here, for purposes of example only, include Check In Passenger, Bag Drop, Save Changes, Uncheck Passenger, and Print.

Each of the finalization actions 310 may include an indication 315, 320 showing that an action is available and/or pre-selected. The process for determining whether the finalization actions 310 are available and/or pre-selected is discussed below in greater detail with respected to FIG. 5A. The pre-selected indication 315 may be any indication showing that the particular action has been pre-selected (e.g., a filled-in radio button; a checked checkbox; etc.), such that it is already in focus upon visiting the finalization screen.

The finalization actions 310 may also be associated with an indication 320 showing that an action is available, but not pre-selected. As with the pre-selected action, the indication 320 may include any typical graphical representation showing that the action may be selected, but that it is not pre-selected upon the user visiting the finalization screen. As shown in user interface 110, the Save Changes action has a corresponding indicator 320 that is an unfilled radio button. If the user wishes to take a course of action that is not within the normal finalization processing (e.g., by choosing an action that was not pre-selected by the system), the user may toggle to the desired available action according to any appropriate user input mechanism such as tabbing, clicking with a mouse or other pointing device, arrow keys, etc.

The finalization actions 310 may also be associated with an indication or a lack of an indication 325 showing that a particular action is unavailable. In the example user interface 110, the Bag Drop and Uncheck Passenger actions are not available to be selected. Such an indication that the action is unavailable may be displayed, for example, via a grayed-out representation of the action. If a finalization action is unavailable, the user cannot select or actuate the action.

In some implementations, all of the possible finalization actions are always shown, regardless of whether they are available in the particular circumstances. However, the finalization actions may be presented in such a way as to indicate to the user that they may not be selected—such as by graying out the actions that are unavailable. In other implementations, the unavailable actions may be hidden from the user and not displayed on the user interface 110.

The user interface 110 may also include an actuation button 330 that corresponds to a user's desire to initiate final processing using the selected finalization action. If the user has not moved away from the pre-selected finalization action, a single click, command, or other appropriate selection will result in the finalization process initiating under the pre-selected finalization action. In the user interface 110, for example, the user may press an Enter key on a keyboard, or may click on the Go button 330 to initiate finalization using the Check In Passenger finalization action.

If the user wants to proceed outside the normal course of the pre-selected finalization processing (e.g., by choosing something other than the pre-selected finalization action), the user may do so using standard data entry techniques. In the present example of user interface 110, the system has pre-selected the Check In Passenger action for finalization because it is the most likely action a user would take in this particular situation. However, if the user determines that this is not a typical situation, one of the other actions may be selected (so long as it is an available action). Here, the user could choose to change to either the Save Changes action or the Print action, but could not choose the Bag Drop action or the Uncheck Passenger action because those are both unavailable in this situation. Because the rules are configured to take into account all of the check-in processing that has already occurred, and potentially one or more other factors related to the check-in procedure, such changes would be less likely to be utilized than the pre-selected action during a normal check-in finalization step.

Figure 4:
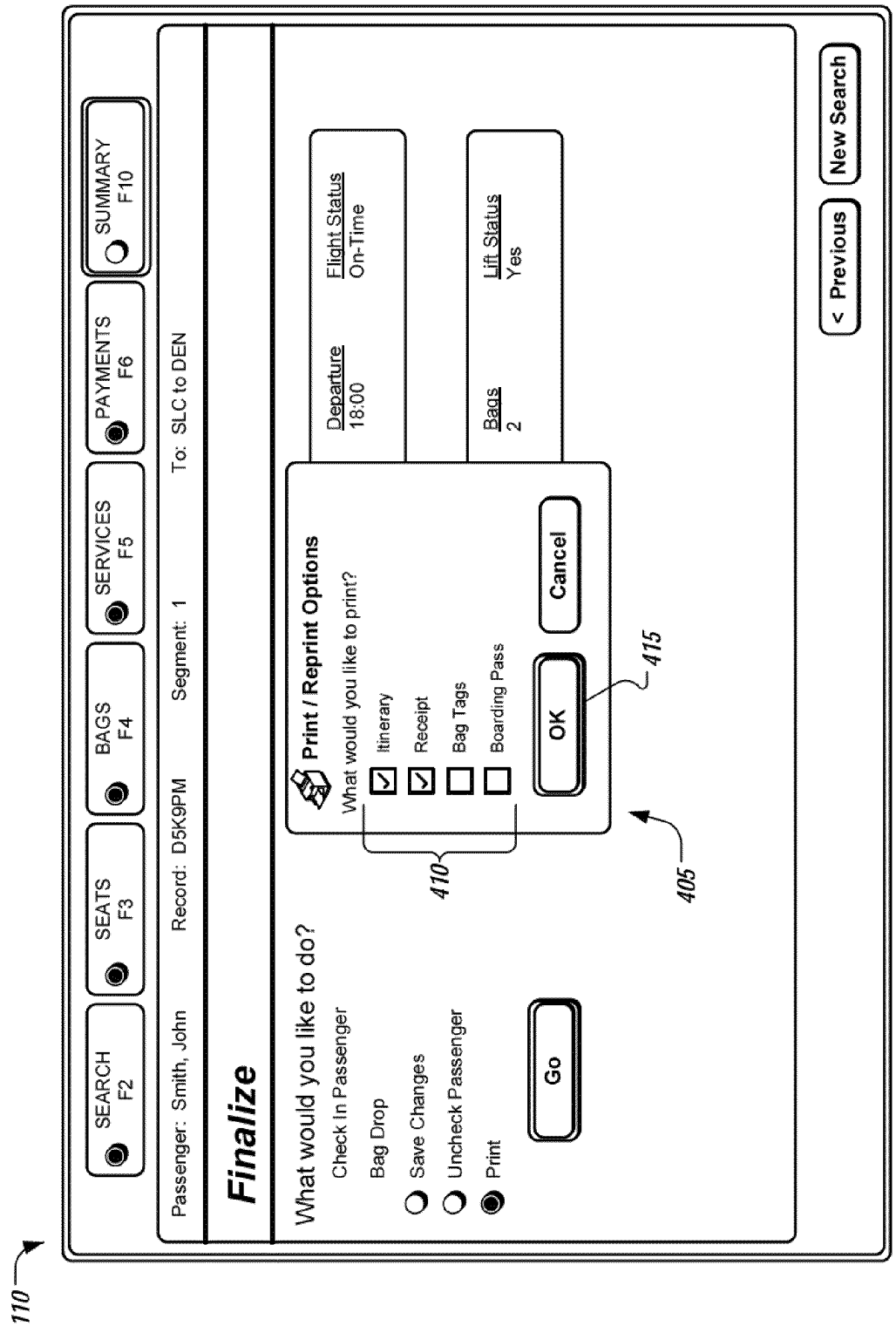

FIG. 4 is another example screen shot of a user interface for a finalization step of a check-in procedure, and illustrates that some finalization actions may also have options or sub-actions associated with them in certain situations. As shown in the user interface 110 of FIG. 4, selecting the Print finalization action may result in additional printing options being shown to the user.

In some implementations, a pop-up box 405 showing the options or sub-actions may appear on the user interface 110. Other similar display techniques may also be used to display the options or sub-actions. As shown, a pop-up box may include a number of options 410 or sub-actions. In some implementations, one or more of the options 410 or sub-actions may also be pre-selected using similar techniques as described above. Also, similarly to the main finalization screen, a single actuation button 415 may have focus such that, if the user does not make any changes to the pre-selection(s), a single keyboard entry, such as the Enter key, may cause the system to accept the pre-selected option(s) and proceed with finalization processing using those options.

However, if the user wants to proceed outside the normal course of finalization processing (e.g., by changing any of the pre-selected options or sub-actions), the user may do so using standard data entry techniques as described above. In the present example user interface 110, the system has pre-selected the Itinerary and Receipt options for printing because these have been configured as the most likely options a user would want to select for this particular action. However, if the user determines that this is not a typical situation, he can either add one of the other options or unselect one or both of the pre-selected options. Because the rules are configured to take into account all of the check-in processing that has already occurred, and potentially one or more other factors related to the check-in procedure, such changes would be less likely to be utilized than the pre-selected action during a normal check-in finalization step.

Figure 5A:
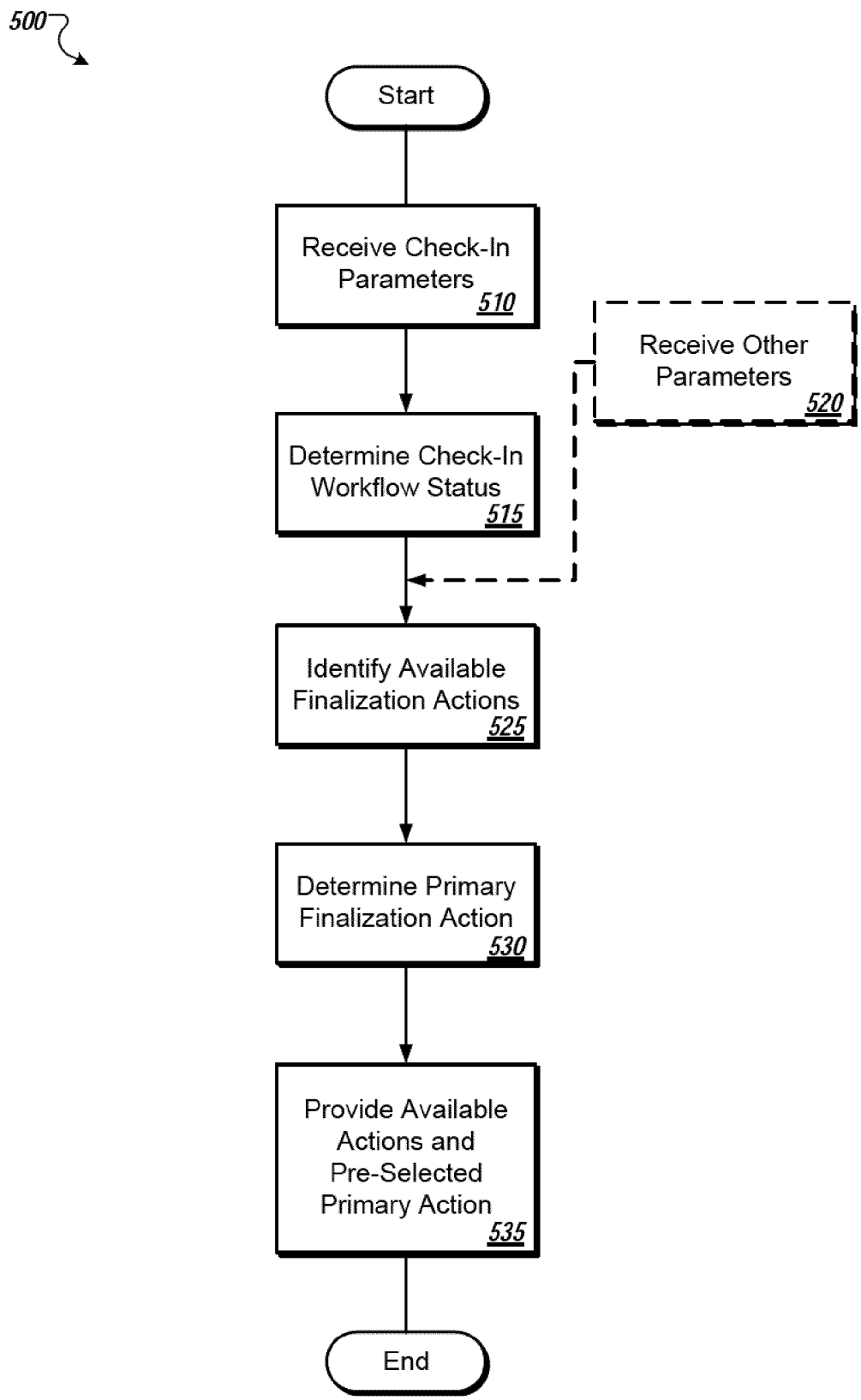
FIG. 5A is a flow chart of an example check-in finalization process.

FIG. 5A is a flow chart of an example check-in finalization process 500. The process 500 may be performed, for example, by a system such as the previously described system 100. However, another system, or combination of systems, may be used to perform the process 500.

At block 510, one or more check-in parameters is received. The check-in parameters may include information related to various things that have occurred (or failed to occur) during the previous steps of the check-in procedure. In some implementations, for example, the check-in parameters may relate to the state of completion of various check-in steps of the check-in workflow; the state of other check-in parameters such as payment authorization and approval parameters; check-in information received from other components of the system; or any other appropriate check-in related parameters.

At block 515, the status of the check-in workflow may be determined, based on the check-in parameters. The status of the check-in workflow may be indicative of an overall state of the passenger check-in procedure (e.g., the passenger has already checked in online; the passenger has checked in, but has not yet checked bags; the passenger has not checked in; etc.). In some implementations, the status may be directly defined in terms of one or more of the check-in parameters. In other implementations, the status may be inferred from the check-in parameters.

From the check-in workflow status, and possibly also based on other parameters received in optional block 520, the available finalization actions may be identified at block 525, and a primary finalization action (e.g., the most likely action of the finalization actions that will be used to initiate the finalization procedures) may be determined at block 530. The identification of the available finalization actions and the determination of the primary finalization action may be carried out by the check-in workflow engine described above. In particular, the check-in workflow engine may identify various configuration rules that apply based on the given check-in workflow status. For example, if a passenger is already checked in, one of the available finalization actions may be to uncheck the passenger, and if such an action is the most likely action for a particular situation, it may be pre-selected as the primary finalization action.

The other parameters received in optional block 520, which may also be used to determine the available finalization actions and the primary finalization action, may include such information as a passenger's preferences or check-in tendencies, the location or type of the terminal, or other appropriate parameters that have some bearing on the availability of and most likely finalization actions presented to the user. For example, if a passenger has indicated a preference to receive copies of his invoice and itinerary when checking-in, the default pre-selected finalization action may be to print those travel documents for the passenger. As another example, if the departure terminal is typically associated with mainly business travelers who frequently need to change flights or fly standby, the default finalization action may be to uncheck the passengers from the flight.

At block 535, information relating to the available finalization actions and the pre-selected primary finalization action may be provided to various components of the system 100, such as to a user interface for display on the user workstation 105.

Figure 5B:
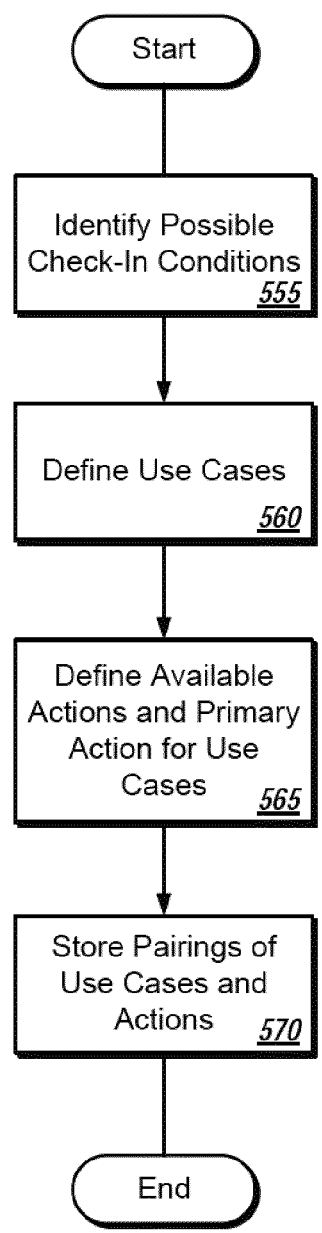
FIG. 5B is a flow chart of an example rules configuration process.

FIG. 5B is a flow chart of an example rules configuration process 550. This process is representative of the steps a travel provider may utilize in defining and storing various configuration rules related to the finalization step of a check-in procedure. As described above, the configuration rules serve to define how a particular check-in situation is handled, particularly in terms of identifying the available finalization actions that are available at a finalization check-in screen, and determining which of the available finalization actions is to be pre-selected as the primary action.

In certain implementations, the configuration of the rules may be based on a statistical analysis of previous situations and actions taken by the check-in agent. For example, the travel provider may determine that, in 97% of all cases where a passenger has checked in to a travel segment online, and where the passenger has indicated that no bags need to be checked, the finalization step used by check-in agents is to print the passenger's boarding pass. As such, a rule may be configured to reflect the print finalization action as the primary action. In some implementations, the rules configuration process may also be based on business-related determinations identifying how the travel providers would like their check-in agents act when presented with a specific set of circumstances.

A typical configuration process for one or more defined scenarios may proceed as follows. First, a configuration analyst may identify at block 555 one or more possible check-in conditions related to how the finalization step of the check-in workflow should be presented to the user. The range of check-in conditions included in this group may be as broad ranging or as narrow as desired, depending on how specific or "intelligent" the travel provider wishes the system to be. Although additional conditions may result in a better likelihood that the system will react appropriately in any given situation, the travel provider may determine that it is not worth identifying every single possible condition that should be taken into account. In certain implementations, a travel provider may determine the appropriate number and types of possible check-in conditions to provide coverage for, as an example, 90% of all check-in scenarios.

The next block 560 of the configuration process may be to define various use cases made up of combinations of one or more of the identified possible check-in conditions. For example, if the travel provider has determined that there are two important check-in conditions to track, and each of them have two or three different possible states or values, then the use cases may be defined to represent all possible permutations of the check-in conditions and the states of those conditions. In this example, one check-in condition may be whether the passenger has already checked in, and the possible values or states may be defined as either yes or no. Another possible check-in condition may be whether the passenger has indicated that he has bags to check in, and the possible values or states may be defined as no bags, 1 or 2 bags, or 3 or more bags. In this example, the different use cases may be defined as all possible permutations of the various conditions: e.g., (1) checked in with no bags; (2) checked in with 1 or 2 bags; (3) checked in with 3+ bags; (4) not checked in, and no bags; (5) not checked in, with 1 or 2 bags; or (6) not checked in, with 3+ bags.

In some implementations, the travel provider may define use cases for all possible check-in condition permutations, but only for valid combinations of those permutations. In the example above, the travel provider may not allow any bags to be indicated if the user has not yet checked in, so the possible permutations taking into account only valid combinations might be (1) checked in with no bags; (2) checked in with 1 or 2 bags; (3) checked in with 3+ bags; or (4) not checked in. In other implementations, the travel provider may only define rules for some subset of the valid check-in combinations.

At block 565, the available finalization actions and the primary action for each of the defined use cases is defined as a pairing linking the use case to the appropriate finalization actions. As such, when a check-in process proceeds to the finalization screen, and the check-in conditions match (or substantially match) a particular use case, the finalization screen displays the available finalization actions with the primary action pre-selected according to the applicable use case/finalization action pairing. At block 570, the use case/finalization action pairings may be stored for later retrieval or lookup, such as by storing the information in a configuration rules database 125*a*.

The finalization actions that are available, and the pre-selected primary finalization action in any given situation may therefore be dependent upon the situation as identified by a number of different check-in conditions and how the travel provider has defined its check-in procedures to be implemented when facing that particular situation.

Figure 6:
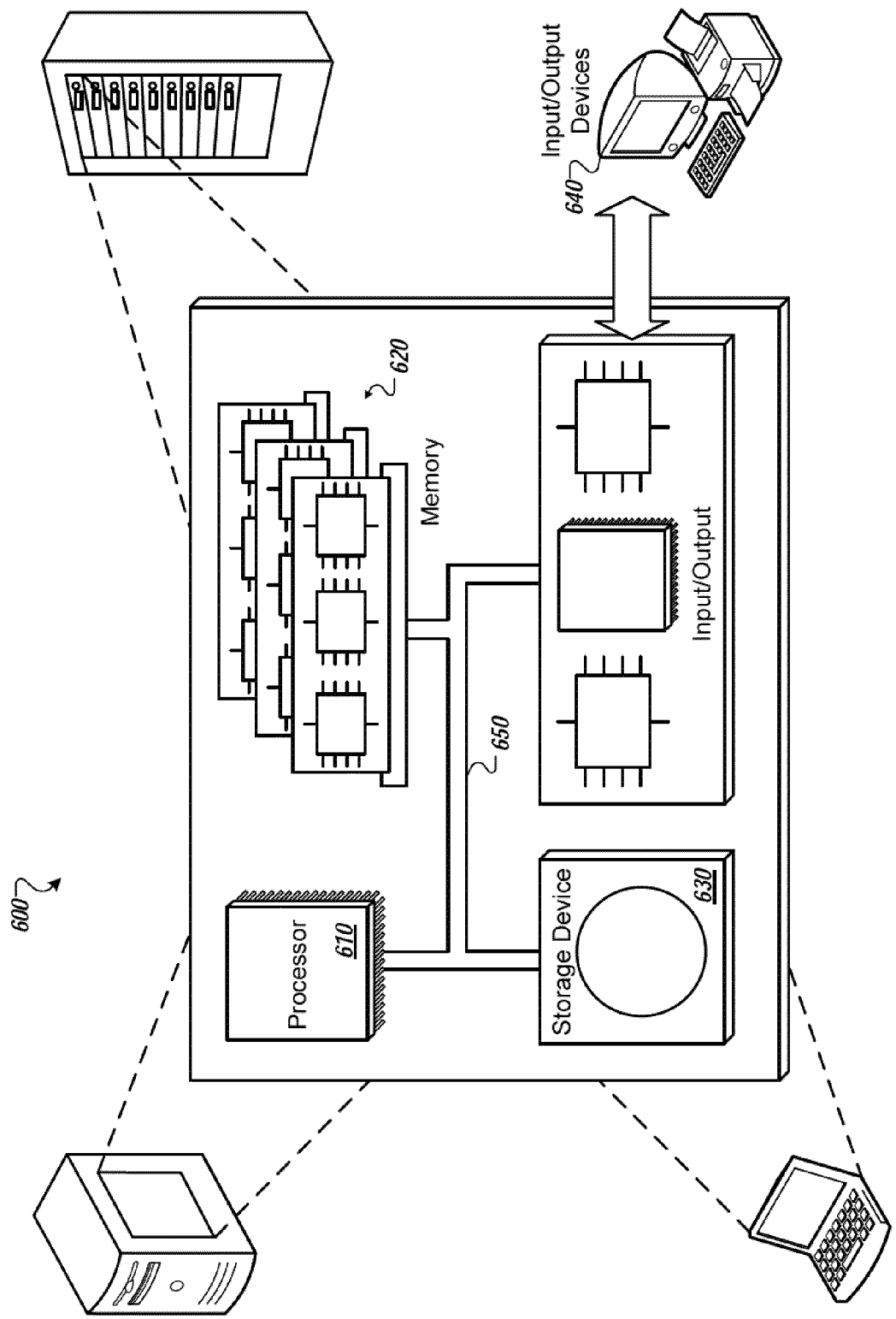
FIG. 6 shows an example of a computer device that can be used to implement the techniques described here.

FIG. 6 is a schematic diagram of a computer system 600. The system 600 can be used for the operations described in association with any of the computer-implement processes described previously, according to one implementation. The system 600 is intended to include various forms of digital computers, such as laptops, desktops, workstations, personal digital assistants, servers, blade servers, mainframes, and other appropriate computers. The system 600 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. The processor may be designed using any of a number of architectures. For example, the processor 610 may be a CISC (Complex Instruction Set Computers) processor, a RISC (Reduced Instruction Set Computer) processor, or a MISC (Minimal Instruction Set Computer) processor.

In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and process steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device.

A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, much of this document has been described with respect to the airline industry, but other travel industry check-in procedures and finalization steps may also be addressed by the systems and techniques described herein. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method of facilitating a check-in finalization process for a travel passenger, the method comprising:

receiving one or more check-in parameters related to a check-in procedure for a passenger checking in for a travel segment at a departure terminal, the one or more check-in parameters being specific to a particular travel provider and including a type of the departure terminal;

converting the one or more check-in parameters to a common parameter type using a look-up table;

determining from the received check-in parameters a first check-in workflow status corresponding to a current completion state of a plurality of steps in the check-in procedure;

identifying, by a computer system, a first set of one or more finalization actions that are available for finalizing the check-in procedure based on the first check-in workflow status;

determining, by the computer system, a first primary finalization action from the one or more finalization actions, the first primary finalization action being most likely to be taken to finalize the check-in procedure, and being based on:

steps that have already been completed in the check-in procedure, an overall status of the check-in procedure, whether the passenger needs to be unchecked, and rules specific to the particular travel provider, or default rules when the rules specific to the particular travel provider are not determinative of a particular first primary finalization action, the rules and default rules being based on statistical analyses of previous situations and actions taken by a check-in agent;

displaying, on a display, a user interface including finalization actions of the first set of one or more finalization actions, wherein the first primary finalization action is pre-selected on the user interface based on a pairing between a use case and a finalization action, the pairing being specific to the particular travel provider; and identifying, by the computer system, a second set of one or more finalization actions that are available for finalizing the check-in procedure based on a second check-in workflow status, the second set of one or more finalization actions being different from the first set of one or more finalization actions.

2. The method of claim 1, wherein determining a first primary finalization action comprises querying a check-in workflow engine using the first check-in workflow status as an input for the query.

3. The method of claim 2, wherein the check-in workflow engine identifies the first primary finalization action by satisfying one or more configuration rules.

4. The method of claim 2, wherein a location of the departure terminal is also used as an input for the query.

5. The method of claim 2, wherein preferences of the passenger checking in are also used as an input for the query.

6. The method of claim 1, wherein the first primary finalization action is actuated by a single user command.

7. The method of claim 1, further comprising determining which of a plurality of available options is most likely to be taken, and pre-selecting options that are most likely to be taken on the user interface as the first set of one or more finalization actions.

8. The method of claim 1, further comprising providing for display on the user interface an indicator corresponding to the first primary finalization action.

9. A computer-implemented passenger check-in system, comprising:
one or more computers including:
an interface for a check-in workflow system configured to receive one or more check-in parameters related to a check-in procedure for a passenger checking in for a travel segment at a departure terminal, the one or more check-in parameters being specific to a particular travel provider and including a type of the departure terminal;
a provider rules database storing configurable rules information associated with a travel provider;
a check-in workflow engine configured to:
convert the one or more check-in parameters to a common parameter type using a look-up table,
identify, using the configurable rules information, a first set of one or more finalization actions that are available for finalizing the check-in procedure based on the one or more check-in parameters,
determine, using the configurable rules information, a first primary finalization action from the first set of one or more finalization actions, the first primary finalization action being most likely to be taken to finalize the check-in procedure, and being based on:
steps that have already been completed in the check-in procedure,
an overall status of the check-in procedure,
whether the passenger needs to be unchecked, and
rules specific to the particular travel provider, or default rules when the rules specific to the particular travel provider are not determinative of a particular first primary finalization action, the rules and default rules being based on statistical analyses of previous situations and actions taken by a check-in agent; and to
identify a second set of one or more finalization actions that are available for finalizing the check-in procedure based on a second check-in workflow status, the second set of one or more finalization actions being different from the first set of one or more finalization actions; and
a display device configured to present a user interface showing finalization actions of the first set of one or more finalization actions, wherein the first primary finalization action is pre-selected on the user interface based on a pairing between a use case and a finalization action, the pairing being specific to the particular travel provider.

10. The system of claim 9, wherein the check-in workflow engine determines the first primary finalization action based at least in part on preferences of the passenger checking in.

11. The system of claim 9, wherein the check-in workflow engine determines the first primary finalization action based at least in part on a location of the departure terminal.

12. The system of claim 9, wherein the first primary finalization action is actuated by a single user command.

13. A computer program product tangibly embodied in a non-transitory computer readable storage medium, the computer program product including instructions that, when executed by one or more computers, cause the one or more computers to perform operations for facilitating a check-in finalization process for a travel passenger, the operations comprising:
receiving one or more check-in parameters related to a check-in procedure for a passenger checking in for a travel segment, the one or more check-in parameters being specific to a particular travel provider and including a type of the departure terminal;
converting the one or more check-in parameters to a common parameter type using a look-up table;
determining from the received check-in parameters a first check-in workflow status corresponding to a current completion state of a plurality of steps of the check-in procedure have been completed;
identifying, by the one or more computers, a first set of one or more finalization actions that are available for finalizing the check-in procedure based on the first check-in workflow status;
determining, by the one or more computers, a first primary finalization action from the first set of one or more finalization actions, the first primary finalization action being most likely to be taken to finalize the check-in procedure, and being based on:
steps that have already been completed in the check-in procedure,
an overall status of the check-in procedure,
whether the passenger needs to be unchecked, and
rules specific to the particular travel provider, or default rules when the rules specific to the particular travel provider are not determinative of a particular first primary finalization action, the rules and default rules being based on statistical analyses of previous situations and actions taken by a check-in agent;
displaying, on a display, a user interface including finalization actions of the first set of one or more finalization actions, wherein the first primary finalization action is pre-selected on the user interface based on a pairing between a use case and a finalization action, the pairing being specific to the particular travel provider; and
identifying, by the one or more computers, a second set of one or more finalization actions that are available for finalizing the check-in procedure based on a second check-in workflow status, the second set of one or more finalization actions being different from the first set of one or more finalization actions.

14. The computer program product of claim 13, wherein determining a first primary finalization action comprises querying a check-in workflow engine using the first check-in workflow status as an input for the query.

15. The computer program product of claim 14, wherein the first check-in workflow engine identifies the first primary finalization action by satisfying one or more configuration rules.

16. The computer program product of claim 14, wherein preferences of the passenger checking in are also used as an input for the query.

17. The computer program product of claim 13, wherein the first primary finalization action is actuated by a single user command.

18. The method of claim 1, further comprising:
- determining, by the computer system, a second primary finalization action from the second set of one or more finalization actions, the second primary finalization action being most likely to be taken to finalize the check-in procedure; and
- displaying, on the display, the user interface including finalization actions of the second set of one or more finalization actions, wherein the second primary finalization action is pre-selected on the user interface.

19. The method of claim 1, wherein the second check-in workflow status is determined based on a user selection of a finalization action of the first set of one or more finalization actions.

* * * * *

UNITED STATES PATENT AND TRADEMARK OFFICE
CERTIFICATE OF CORRECTION

| | | |
|---|---|---|
| PATENT NO. | : 8,645,172 B2 | Page 1 of 1 |
| APPLICATION NO. | : 12/550784 | |
| DATED | : February 4, 2014 | |
| INVENTOR(S) | : Thomas Walter Heinrich Mehl et al. | |

It is certified that error appears in the above-identified patent and that said Letters Patent is hereby corrected as shown below:

Title Page, column 2 (Other Publications), entry 1, line 1, delete "retreived" and insert -- retrieved --, therefore.

Title Page, column 2 (Other Publications), entry 1, line 2, delete "2013m" and insert -- 2013 --, therefore.

Signed and Sealed this
First Day of July, 2014

Michelle K. Lee
*Deputy Director of the United States Patent and Trademark Office*

UNITED STATES PATENT AND TRADEMARK OFFICE
CERTIFICATE OF CORRECTION

| | |
|---|---|
| PATENT NO. | : 8,645,172 B2 |
| APPLICATION NO. | : 12/550784 |
| DATED | : February 4, 2014 |
| INVENTOR(S) | : Mehl et al. |

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 819 days.

Signed and Sealed this
Second Day of June, 2015

Michelle K. Lee
*Director of the United States Patent and Trademark Office*